(12) United States Patent
Barton et al.

(10) Patent No.: US 8,281,586 B2
(45) Date of Patent: Oct. 9, 2012

(54) METHOD FOR OPERATING AN ENGINE TO ADJUST TURBOCHARGER PERFORMANCE CHARACTERISTICS

(75) Inventors: Jason T. Barton, Canton, MI (US); Daniel W. Potter, South Lyon, MI (US); Andrew M. Mitchell, Garden City, MI (US); Stephen E. Kramer, Novi, MI (US); Kevin K. Luther, Canton, MI (US); Marie A. Racette, Plymouth, MI (US)

(73) Assignee: Detroit Diesel Corporation, Detroit, MI (US)

( * ) Notice: Subject to any disclaimer, the term of this patent is extended or adjusted under 35 U.S.C. 154(b) by 455 days.

(21) Appl. No.: 12/637,531

(22) Filed: Dec. 14, 2009

(65) Prior Publication Data

US 2011/0138804 A1    Jun. 16, 2011

(51) Int. Cl.
    *F02D 23/00*    (2006.01)

(52) U.S. Cl. .......................................... 60/602; 60/600
(58) Field of Classification Search ................... 60/599, 60/600, 601, 602
    See application file for complete search history.

(56) References Cited

U.S. PATENT DOCUMENTS

| | | | |
|---|---|---|---|
| 6,035,640 A * | 3/2000 | Kolmanovsky et al. ...... | 60/605.2 |
| 6,067,799 A * | 5/2000 | Heinitz et al. ................. | 60/602 |
| 6,601,387 B2 | 8/2003 | Zurawski et al. | |
| 6,665,604 B2 * | 12/2003 | Arnold ........................ | 701/100 |
| 8,151,567 B2 * | 4/2012 | Rollinger et al. .............. | 60/602 |
| 2003/0149522 A1* | 8/2003 | Arnold ........................ | 701/100 |
| 2009/0048802 A1* | 2/2009 | Wang et al. ................... | 702/138 |

* cited by examiner

*Primary Examiner* — Thomas Denion
*Assistant Examiner* — Patrick Maines
(74) *Attorney, Agent, or Firm* — Bill C. Panagos; Butzel Long, PC

(57) ABSTRACT

A method to operate an electronically controlled internal combustion engine having an electronic central unit with memory a turbocharger and exhaust gas recirculation valve to determine performance characteristics of said variable geometric turbocharger.

10 Claims, 3 Drawing Sheets

METHOD FOR OPERATING AN ENGINE TO ADJUST TURBOCHARGER PERFORMANCE CHARACTERISTICS

TECHNICAL FIELD

In the operation of electronically controlled internal combustion engines, variable geometry turbochargers (VGT) vary the expansion ratio of the exhaust gas in real time to adjust the performance characteristics of the engine for optimal operation at any given engine speed and load. The system must be calibrated to produce the correct amount of boost for a given input to the turbine wheel. Manufacturers typically perform this operation on an air flow rig, which provides a specific air flow to the turbine wheel, the energy of which is then translated to the compressor wheel in varying amounts controlled by the variable geometry of the vane set in the compressor housing. The turbochargers are calibrated to produce a given output of air flow from the compressor side at this given inlet air flow, by means of the adjustment of a turnbuckle, which shortens and lengthens the connecting rod between the actuator and vane set. When a turbocharger comes out of adjustment, a similar procedure would be ideal, but it has previously been determined that requiring this complicated equipment be present at every service facility would be prohibitively expensive and overly complicated. Moreover, when a turbocharger is replaced in the field for performance complaints, it is often determined upon examination and the manufacturer that there are no issues with its function.

There is a need to create a field procedure to determine whether a turbocharger's performance is within an acceptable range and optimize turbocharger performance on a given engine. Such a procedure would ideally be performed while the turbocharger is on the engine.

BRIEF SUMMARY

In one embodiment, the instant disclosure is a method to operate an electronically controlled internal combustion engine having an electronic central unit (ECU) with memory to variable geometric turbo charge and exhaust gas recirculation valve (EGR) to determine performance characteristics of said variable geometric turbocharger (VGT). The method may comprise determining whether the engine is operating at predetermined temperature and first predetermined engine speed (rpm) for a predetermined period of time, operating said engine at a second predetermined rpm; increasing engine load, closing said EGR value and setting said VGT vane position to a predetermined percentage of maximum vane output, determining ambient barometric pressure, determining intake manifold pressure, determining ratio of intake manifold pressure to ambient barometric pressure, and determining whether said ratio of intake manifold pressure to ambient barometric pressure equals a predetermined pressure value.

Preferably, the method may further include using a service tool to initiate the method as described, and further includes using a PC as the service tool.

DETAILED DESCRIPTION

Figure 1:
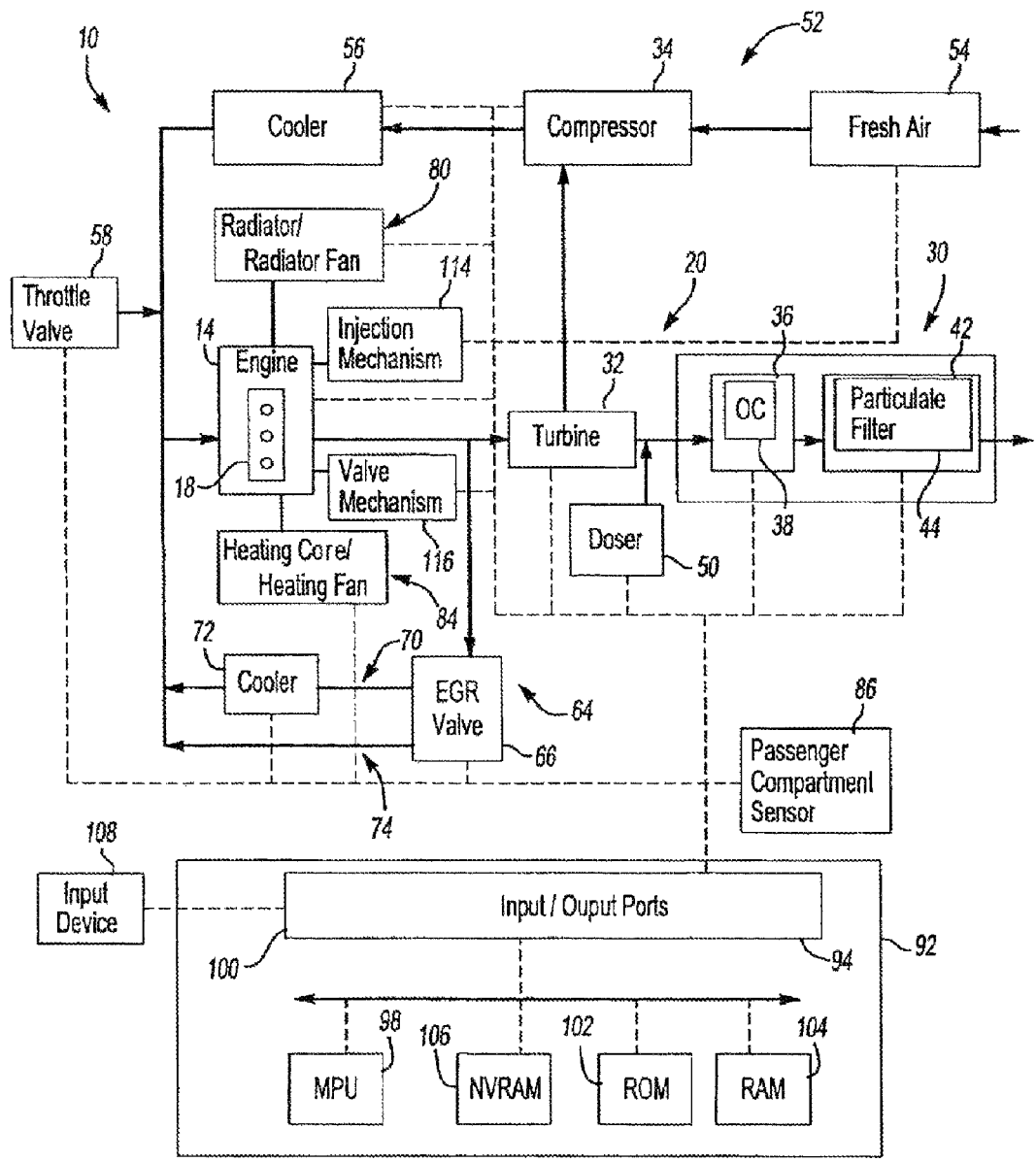
FIG. 1 is a schematic representation of an electronically controlled internal combustion engine equipped with an intake manifold and variable geometry turbocharger.

Turning now to the drawings wherein like numbers refer to like structures, FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust oases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gasses and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

A air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating, demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others. Device 108 may be service tool or a PC.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2A:
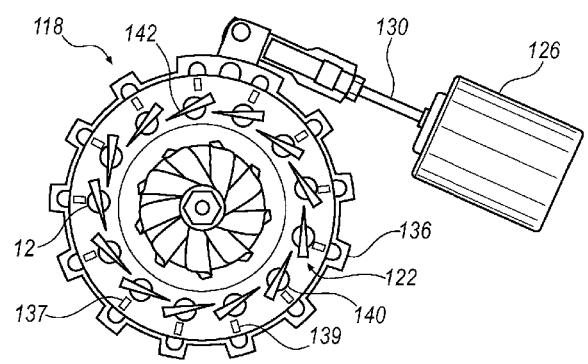
FIG. 2 is a schematic representation of a variable geometry turbocharger.
Figure 2B:
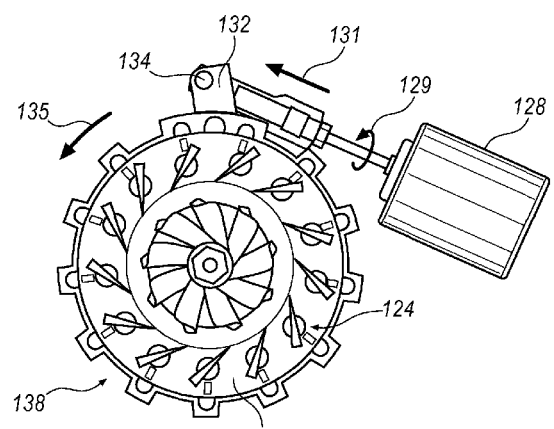

FIGS. 2A and 2B are a close-up schematic representation of one type of variable geometry turbocharger useful in the according to the disclosure. Specifically, variable geometry turbocharger 118 has a plurality of pivotably adjustable vanes 120 from a close position 122 to an open position 124. The vanes are adjusted by an electric motor 126 comprised of a housing 128 with an armature in the housing (not shown) that rotates shaft 130 in response to signals from the ECU indicative of changes in pressure. The rotation of the armature causes shaft 130 to rotate in direction 129 and exert force 131 on flange 132 by pivot 134 using a mechanism as is conventional for translating rotation of a shaft into linear direction 131, to cause ring 136 to rotate in direction 135 about the perimeter 138 of the turbocharger. The vanes are pivotably attached at 137 via linkage 139 to the ring and are moved pivotably about their longitudinal axis 140 to change position from a low vane output position 142 to a high vane output position 144. The amount of movement of the vanes from a normal operation to a low output position and a high output position are of equal quantities and opposite to each other relative to normal position. To vary the vane output, the vanes are pivotably adjusted an equal and opposite amount relative normal operation in order to reach low output and high output.

Figure 3:
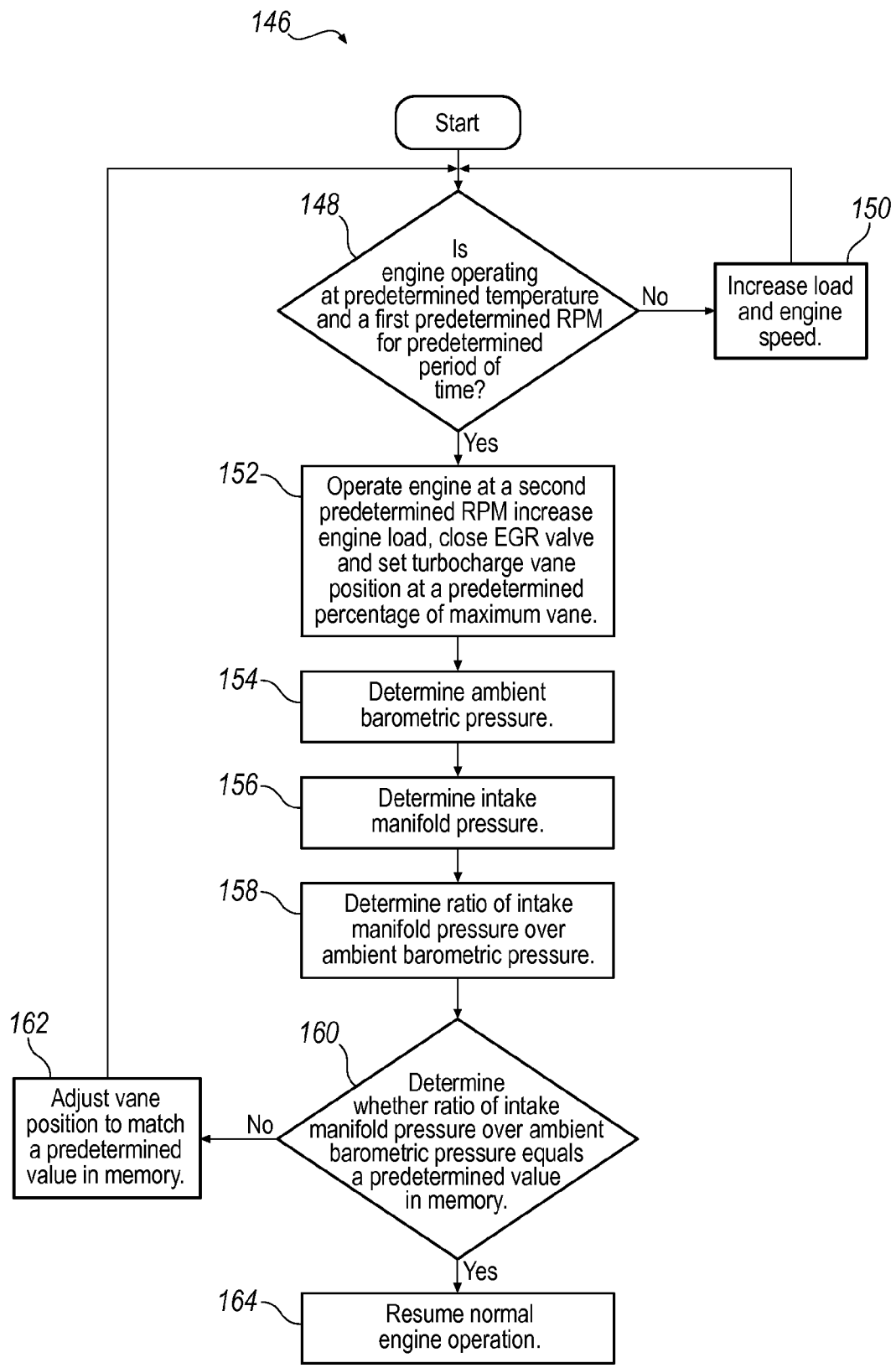
FIG. 3 is a schematic representation of one method according to one aspect of the disclosure.

FIG. 3 is a schematic representation of one method 146 according to one disclosed embodiment. Specifically, step 148 is determining whether the engine is operating at a predetermined temperature and a predetermined engine speed (rpm) for a predetermined period of time. It is important that the engine is operating at normal engine operating temperatures and engine speed in order to determine whether the turbocharger is operating in a manner consistent with its normal operating procedure to study its performance characteristics to determine whether to adjust the turbocharger vane linkage to move the vanes and change the performance characteristics of the turbocharger according to this embodiment of the method. If it is determined that the engine is not operating at a normal temperature and engine speed for a predetermined period of time (all such values being stored in memory), then at step 150, the method increases the engine speed and load to facilitate rapid warm up of the engine. In this regard, the engine accessories may be used to increase the engine load, such as, for example, engaging the engine fan to increase the load on the engine. The first predetermined engine speed is specific to the type of engine, and in some cases, the engine speed may be 1200 rpm. The method then loops back to step 148 for the determination as stated above.

If the determination in step 148 is yes, then step 152 is operating the engine at a second predetermined rpm that is preferably higher than the first predetermined rpm, and increase the engine load by use of the engine accessories such as the engine fan, close the EGR valve and set the turbocharger vane position at a predetermined maximum percentage of vane position. In the event a turbocharger is used that is not a VGT, but rather uses a wastegate, the measured vane position is compared to a predetermined vane position memory in memory. The predetermined maximum percentage vane position is a value held in memory in the ECU and in some instances, may be 60% of maximum vane position based upon engine speed. The second predetermined engine speed is preferably equal to or higher than the first predetermined engine speed and is a value that is stored in memory in the ECU. This value is engine specific and in some cases, may be 1600 rpm.

At step 154, the method determines the ambient barometric pressure of air. This is generally accomplished by use of sensors to generate data signals indicative of the ambient barometric pressure and convey such signals to the ECU. At step 156, the method determines the intake manifold air pressure. At 158, the method determines the ratio of intake manifold air pressure over the ambient barometric pressure. Step 160 is determining whether the ratio of the intake air manifold pressure over the ambient barometric pressure equals a predetermined value stored in memory. If not, step 162 is a signal to an operator to adjust the vane position to match a predetermined value in memory and then the method loops back to step 148 and the method repeats itself. If it determined that the ratio of the intake air manifold pressure over the ambient barometric pressure equals a predetermined value stored in memory, the engine resumes normal operation at seen in step 164.

The words used herein are understood to be words of description, and not words of limitation. Those skilled in the art recognize that many variations and modifications are possible without departing from the scope and spirit of the invention as set forth in the appended claims.

What is claimed as new and desired to be protected by Letters Patent of the United States is:

1. A method to operate an electronically controlled internal combustion engine having an electronic control unit (ECU) with memory, a turbocharger with actively controllable boost output, and exhaust gas recirculation valve (EGR) to determine performance characteristics of said turbocharger, said turbocharger equipped with at least one of a wastegate and a variable geometry, comprising:
    determining whether the engine is operating at predetermined temperature and first predetermined engine speed (rpm) for a predetermined period of time;
    operating said engine at a second predetermined rpm; increasing engine load; closing said EGR value and comparing said turbocharger vane output position to a predetermined percentage of maximum vane output;
    determining ambient barometric pressure; determining intake manifold pressure;
    determining ratio of intake manifold pressure to ambient barometric pressure;
    determining whether said ratio of intake manifold pressure to ambient barometric pressure equals a predetermined pressure value;
    wherein said boost is controlled by vane position, said vane position adjusted to a predetermined vane position value in memory when the ratio of intake manifold pressure to ambient barometric pressure does not equal a predetermined pressure value when said turbocharger is equipped with said variable geometry.

2. The method of claim 1, wherein engine load and engine speed are increased if the engine is not operating at predetermined engine speed and temperature for a predetermined period of time.

3. The method of claim 1, further including using a service tool to initiate said method.

4. The method of claim 3, wherein said service tool is a personal computer.

5. The method of claim 3, further including verifying said service tool connecting to said ECU.

6. The method of claim 1, wherein said predetermined vane position is 60% of maximum vane position.

7. The method of claim 1, wherein said first predetermined engine speed is 1200 rpm.

8. The method of claim 1, wherein said second predetermined engine speed is 1600 rpm.

9. The method of claim 1, wherein engine load is increased by engaging at least one engine accessory.

10. The method of claim 9, wherein said engine accessory is an engine fan.

* * * * *